(12) United States Patent
Hung

(10) Patent No.: US 7,396,094 B2
(45) Date of Patent: Jul. 8, 2008

(54) GENERAL SERIAL INTERFACE SYSTEM

(75) Inventor: Hao-Feng Hung, Taipei (TW)

(73) Assignee: Qisda Corporation, Shan-Ting Tsun, Gueishan Hsiang, Taoyuan County (TW)

( * ) Notice: Subject to any disclaimer, the term of this patent is extended or adjusted under 35 U.S.C. 154(b) by 558 days.

(21) Appl. No.: 10/908,632

(22) Filed: May 19, 2005

(65) Prior Publication Data

US 2005/0275674 A1 Dec. 15, 2005

(30) Foreign Application Priority Data

May 26, 2004 (TW) ............................... 93114921 A

(51) Int. Cl.
*B41J 29/38* (2006.01)
(52) U.S. Cl. .................. 347/9; 347/10; 347/11
(58) Field of Classification Search .................. 347/5, 347/9, 10–12, 14, 15, 57; 710/71, 305; 370/503; 714/718, 724; 358/1.2, 1.9; 365/83, 93, 365/189.05
See application file for complete search history.

(56) References Cited

U.S. PATENT DOCUMENTS

| | | | |
|---|---|---|---|
| 5,987,542 A | 11/1999 | Bang | |
| 6,075,663 A | 6/2000 | Chae | |
| 7,284,170 B2 * | 10/2007 | Whetsel | ........... 714/724 |
| 2002/0009983 A1 | 1/2002 | Pritchett et al. | |
| 2003/0061431 A1 * | 3/2003 | Mears et al. | ........... 710/305 |
| 2006/0187968 A1 * | 8/2006 | Spooner | ........... 370/503 |

FOREIGN PATENT DOCUMENTS

| | | |
|---|---|---|
| DE | 197 23 964 | 4/1998 |
| DE | 197 24 956 | 4/1998 |

* cited by examiner

*Primary Examiner*—Lamson D. Nguyen
(74) *Attorney, Agent, or Firm*—Winston Hsu

(57) ABSTRACT

A serial transmission control system accesses data based on status signal, includes a timing register for storing a predetermined times of a basic period width and a predetermined number of trigger times, a data buffer for storing data, a timing control state machine for outputting the status signal until receiving a terminal signal. The status signals have a period width complying with the predetermined time of the basic period width. While the terminal signal is received and a number of outputting the status signals does not comply with the predetermined number of trigger times, the status signal will keep outputting until complying with the predetermined number of trigger times. A transforming circuit is for accessing the data stored in the data buffer.

7 Claims, 10 Drawing Sheets

$Wa = \overline{N_3} \overline{N_2} N_1 + N_3 N_2$
$Wb = N_3 N_2$

| N₃N₂ / N₁N₀ | 00 | 01 | 11 | 10 |
|---|---|---|---|---|
| 00 |  |  | [1] |  |
| 01 |  |  | [1] |  |
| 11 | [1] |  | [1] |  |
| 10 | [1] |  | [1] |  |

Fig. 10

GENERAL SERIAL INTERFACE SYSTEM

BACKGROUND OF INVENTION

1. Field of the Invention

The invention relates to a series transmission system and, more particularly, to a series transmission system capable of working at different timings.

2. Description of the Prior Art

Today's electronic products, for example cell phones, PDA's, or personal computers, all comprise many micro-processing systems to organize multiple processing functions. In a micro-processing system, a method of sequential control of clock triggers is often utilized for making different devices perform different functions at different timings so that the whole micro-processing system can achieve predetermined functions. For example, if a micro-processing system has to achieve a certain function, the A circuit of the micro-processing system processes data first, and then the B circuit of the micro-processing system carries out the following process of the data. A micro-processing system can utilize the sequential control method to trigger the A circuit to start processing the data, and sequentially trigger the A circuit to transfer processed data to the B circuit. The micro-processing system then further triggers the B circuit to receive the processed data so that the B circuit can do the following processing operation on said data. In other words, through the above-mentioned triggering of the sequential control, the micro-processing system can coordinate the processing order of every circuit in the micro-processing system so that the micro-processing system can complete a certain function.

Before the micro-processing system transfers data to the transmission interface it often utilizes a byte as a unit. For saving transmission resources, however, the system sometimes divides the data into multiple bytes, transfers the data in these bytes, and transforms them back into the original data once they have been received. The above-mentioned transmission method, which utilizes bytes as units, is called the series transmission.

In the prior art, series transmission between each integrated circuit (IC) in the micro-processing system is accomplished through a specific transmission protocol (for example, $I_2C$ and SPI) according to the needed data form of the series transmission; or accomplished through a series transmission structure defined by an ASIC. This means that designers can define clock signals, series data signals, and series control signals of the series transmission, which saves the number of data transmission signals between ICs and accomplishes the purpose of data exchange between ICs. Generally speaking, the clock signals, the series data signals, and series control signals have different definitions and timings because the form and the application of series transmission can be different. Therefore, we often utilize two methods to design the series transmission interface. The first method is to design specific hardware to meet the demands of series transmission timing control according to the individual data form of each series transmission signal. The other method is to utilize one or more micro-controllers to meet these series transmission timing control demands.

Now, taking an inkjet printer as example, in order to achieve the goal of simple design and low cost the number of ICs can be reduced to 3 or 4. Please refer to FIG. 1, which is a block diagram of a printer 10 according to the prior art. As shown in FIG. 1, the printer 10 comprises a main control module for controlling and calculating image data, and controlling motors and memories; a memory module 14 used as an image data buffer, a program code buffer, and an inkjet state data buffer; a DC-DC converter and motor driver module 16 for supplying power and driving motors; and an inkjet driver module 18 for driving the inkjets. In the inkjet printer 10, modules having different functions utilize the following signals to communicate with each other and to process data. The first signal is the series transmission clock for triggering data signals. Generally speaking, there are three triggering methods; positive edge trigger, negative edge trigger, and both edges trigger. The second signal is the series transmission control signal. The control signal is often an enabling signal for controlling IC in a simple series transmission. Finally, the third signal is the series transmission data signal used as the register data of the IC to be controlled. Please note that the data signal can be unidirectional or bi-directional data.

Although modules transfer signals through the series transmission, IC modules from different producers may not utilize the same series transmission. In order to integrate all modules, the main control module 12 has to be designed as specific hardware to meet the demands of series transmission timing control according to the individual data form of each series transmission signal. The alternative option is for the main control module 12 to utilize one or more micro-controllers to meet the demands of series transmission timing control, again according to the individual data form of each series transmission signal. Therefore, if other modules (for example, the DC-DC converter and motor driver module or the inkjet driving module) change, the original series transmission signals are no longer used, causing the series transmission signals to have to be modulated. This causes a design problem.

SUMMARY OF INVENTION

It is therefore a primary objective of the claimed invention to provide a series transmission control system capable of accessing data according to state signals, to solve the above-mentioned problem.

According to an exemplary embodiment of the claimed invention, a serial transmission control system capable of accessing data according to a status signal is disclosed, the serial transmission control system comprising: a timing register for storing a predetermined time of a basic period width and a predetermined number of trigger times; a data buffer for storing data; a timing state machine for repeatedly outputting the predetermined number of triggering times of the status signals when receiving a starting signal and until receiving a terminal signal, and for stopping outputting the state signal when completely outputting the predetermined number of triggering times of the state signals; wherein the period width of the status signals complies with the predetermined time of the basic period width; and a register for accessing the data stored in the data buffer according to the state signal generated by the timing state machine.

Furthermore, a method is disclosed for controlling serial transmission of a system, the system comprising a data buffer for storing data, the method comprising: when receiving a starting signal, repeatedly outputting a predetermined number of triggering times of state signals until receiving a terminal signal, and stopping outputting the state signal when completely outputting the predetermined number of triggering times of the state signals, wherein the state signals have a period width that complies with a predetermined time of a basic period width; and accessing the data stored in the data buffer according to the state signal.

In addition, a printer is disclosed. The printer comprises a timing register for storing a predetermined time of a basic period width and a predetermined number of triggering times; a timing state machine for repeatedly outputting the predetermined number of triggering times of state signals when receiving a starting signal and until receiving a terminal signal, and for stopping outputting the state signal when completely outputting the predetermined number of times of the state signals, wherein the state signals have a period width that complies with the predetermined times of the basic period width; a logic circuit for generating a first control signal and a second control signal according to the state signal generated by the timing state machine; a control signal selector electrically coupled to the logic circuit for controlling the logic circuit to output the first control signal or the second control signal; and an inkjet electrically coupled to the logic circuit for controlling the time of heating inks according to the first control signal or the second control signal outputted by the logic circuit.

Additionally, a method for controlling a printer is disclosed. The method comprises when receiving a starting signal and until receiving a terminal signal, repeatedly outputting a predetermined number of triggering times of state signals, and stopping outputting the state signals when completely outputting the predetermined number of triggering times of the state signals, wherein the state signals have a period width that complies with a predetermined times of a basic width; generating a first control signal and a second control signal according to the state signals; choosing to output the first control signal or to output the second control signal; and controlling the time of heating inks according to the first control signal and the second control signal.

Furthermore, a system capable of multiplex controlling to output at different timings is disclosed. The system comprises n subsystems respectively operating at different timings; and a main system for generating signals used to distribute different timings, the main system comprising: a clock controller for storing n basic period widths and corresponding n predetermined number of triggering times, wherein each basic period width corresponds to one predetermined triggering time; a data buffer for storing data; a timing state machine for repeatedly outputting the predetermined number of times of state signals when receiving a starting signal from one of the subsystems and until receiving a terminal signal, and for stopping outputting the state signals when completely outputting the predetermined number of triggering times of the state signals, wherein the state signals have a period width that complies with the predetermined times of the basic period width; a register for accessing data stored in the data buffer according to the state signals generated by the timing state machine; and an I/O port for outputting the data stored in the data buffer to the subsystems or outputting the data of the system to the data buffer.

Furthermore, a method for controlling a transmission of a system is disclosed, where the system comprises a data buffer for storing data, and the method comprises setting n basic period widths and corresponding n predetermined number of triggering times, wherein each period width corresponds to a predetermined triggering time; repeatedly outputting the predetermined number of triggering times of state signals when receiving a starting signal from a subsystem and until receiving a terminal signal, and stopping outputting the state signal when completely outputting the predetermined number of triggering times of the state signals, wherein the state signals have a period width that complies with the predetermined times of the basic period width; and accessing data stored in the data buffer according to the state signal.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 10 is a Karnaugh map of the assemble logic in FIG. 6.

DETAILED DESCRIPTION

As mentioned above, the signals and timings utilized in the series transmission may be different. In the following disclosure, the present invention system can integrate different signals and timings of different modules.

Figure 2:
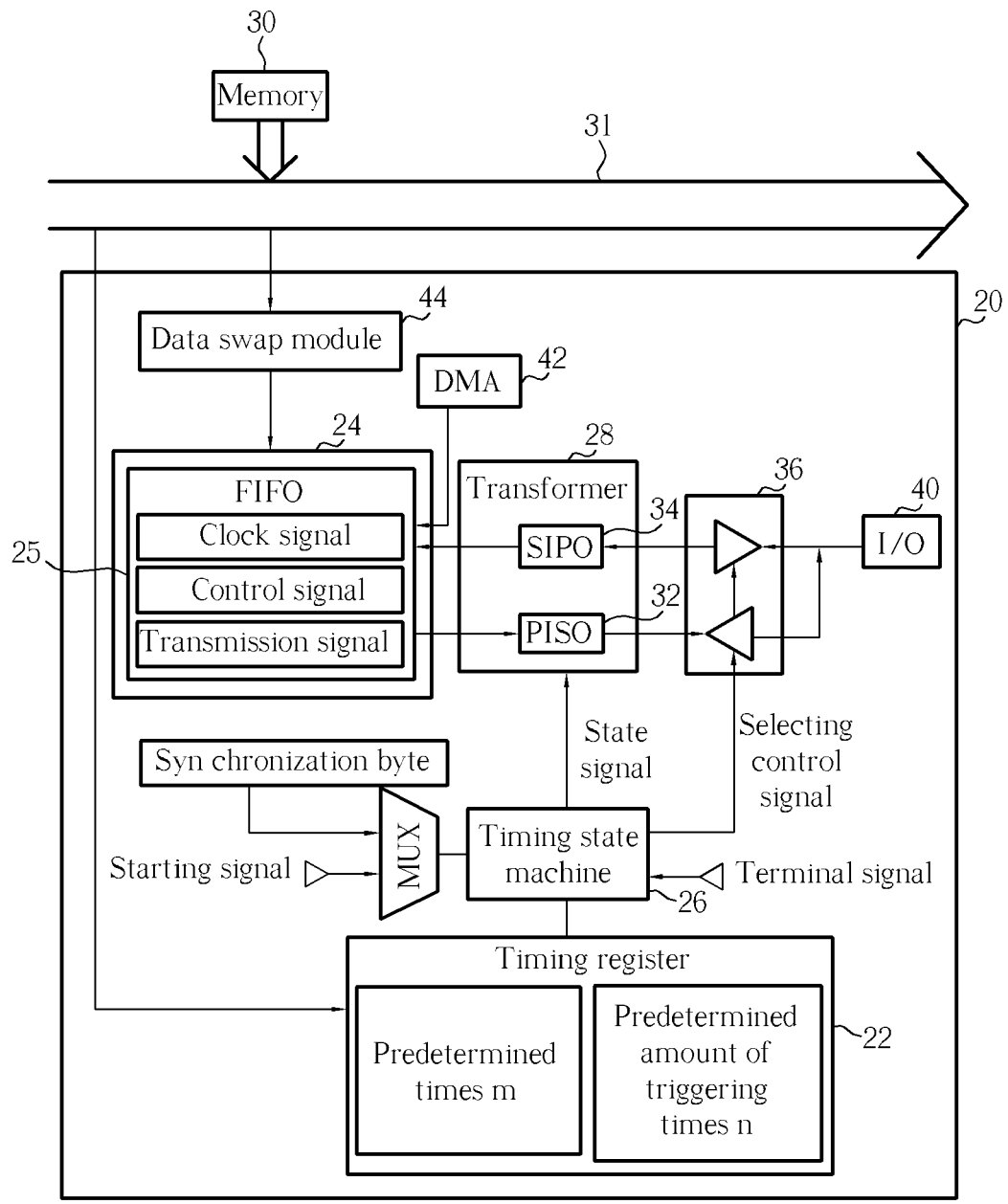
FIG. 2 is a block diagram of a system according to the present invention.
Figure 3:
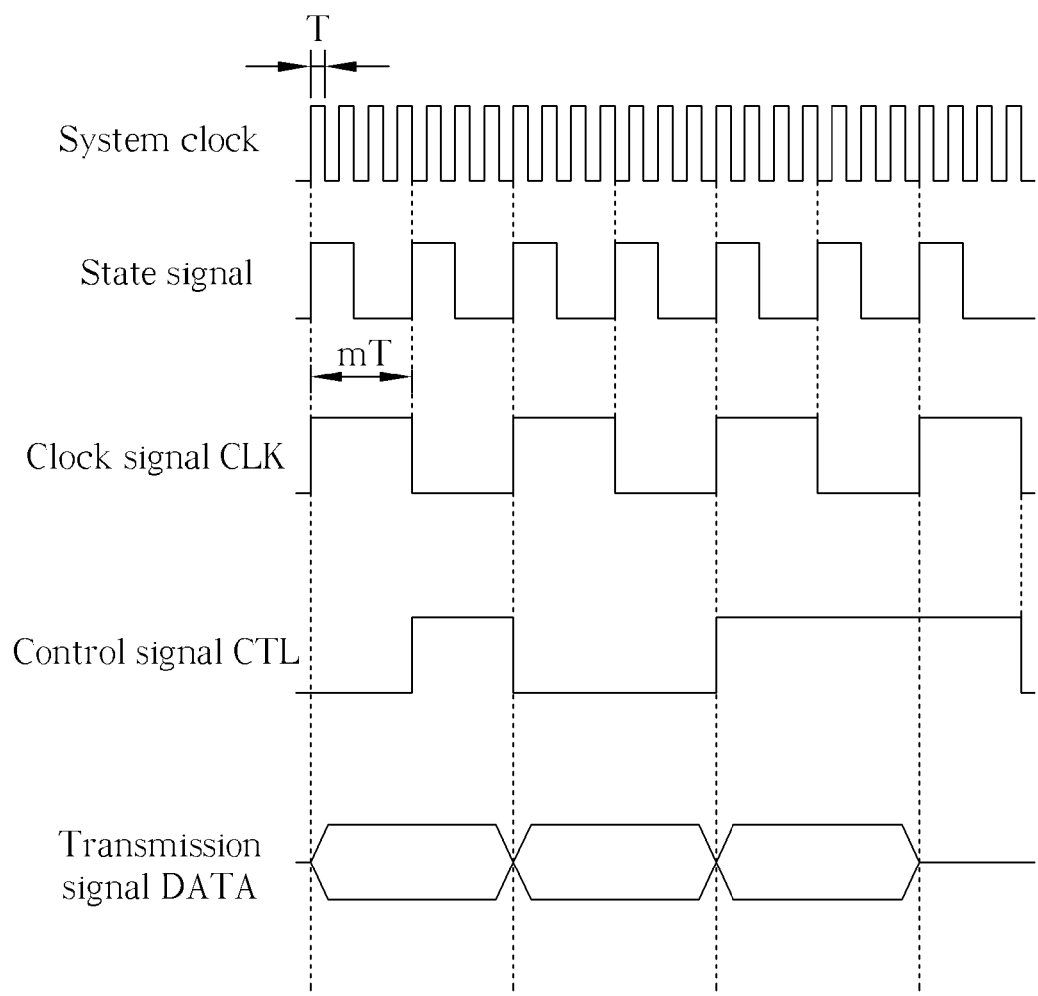
FIG. 3 is a timing diagram of signals according to the present invention.

Please refer to FIG. 2 and FIG. 3. FIG. 2 is a block diagram of a system 20 according to the present invention. FIG. 3 is a timing diagram of signals according to the present invention. The system comprises a timing register 22, a data buffer 24, and a timing state machine 26. The system 20 is operated with a clock having a basic period width T. The timing register 22 is utilized to store a predetermined time m of the basic period width and a predetermined triggering time n. When the system 20 needs to output data stored in the memory 30, the data is transferred through a system bus 31 to the data swap module 44 and then the data is swapped and transferred to the data buffer 22. Alternatively, the data stored in the memory 30 can be stored in the data buffer 24 through the DMA controller 42. The FIFO buffer array 25 in the data buffer 24 stores the data transferred by the memory 30 or other related transmission signals, which are the clock signal and the control signal. When the timing state machine 26 receives a starting signal, the timing state machine 26 outputs n state signals having a period width m*T to a register 28. The register 28 accesses the data stored in the data buffer according to the state signal until it receives a terminal signal. To give an example, assume that the system needs to output data to another system in a predetermined time interval through the series transmission. When the timing state machine 26 receives the starting signal, the timing state machine 26 generates state signals according to the predetermined times m of the basic period width T (in other words, the timing state machine 26 generates state signals per m*T time interval) and controls the FIFO buffer array 25 to output needed data to a PISO transformer 32 so that the PISO transformer 32 outputs the data into an output port 40 per m*T time interval in a series transmission. Finally, the data is transferred to another system connected to the output port 40. Here, if the outputting number of the state signals complies with the predetermined triggering time n but no terminal signal is received, the state signal is repeatedly outputted n times until the terminal signal is received. When the timing state machine 26 receives the terminal signal, the timing state machine 26 stops outputting the state signal. At this time, if the state signal is only outputted k times (where k is less than n), the timing state machine 26 completely outputs the state signal n times and then stops outputting the state signal. Furthermore, in order to ensure that the content of the transmission data signal is synchronous with the clock signal, a synchronization byte is placed above the transmission data signal.

In addition, the data inputted into the system 20 can be controlled through similar methods. That is, when the data is transferred from the output port 40 into the data buffer 24, a speed of transforming the series data into the parallel data, which is performed by the SIPO transformer 34, can be changed by adjusting the predetermined time of the basic period width stored in the timing state machine 26.

The system 20 further comprises a selecting unit 36 (which can be a multiplexer or a tri-state buffer), which chooses to transform the data into a series data through the PISO transformer and to utilize the output port 40 to output the series data; or to transform data into a parallel data through SIPO register 34 and to store the parallel data in the data buffer according to the control signal outputted by the timing state machine 26.

Figure 4:
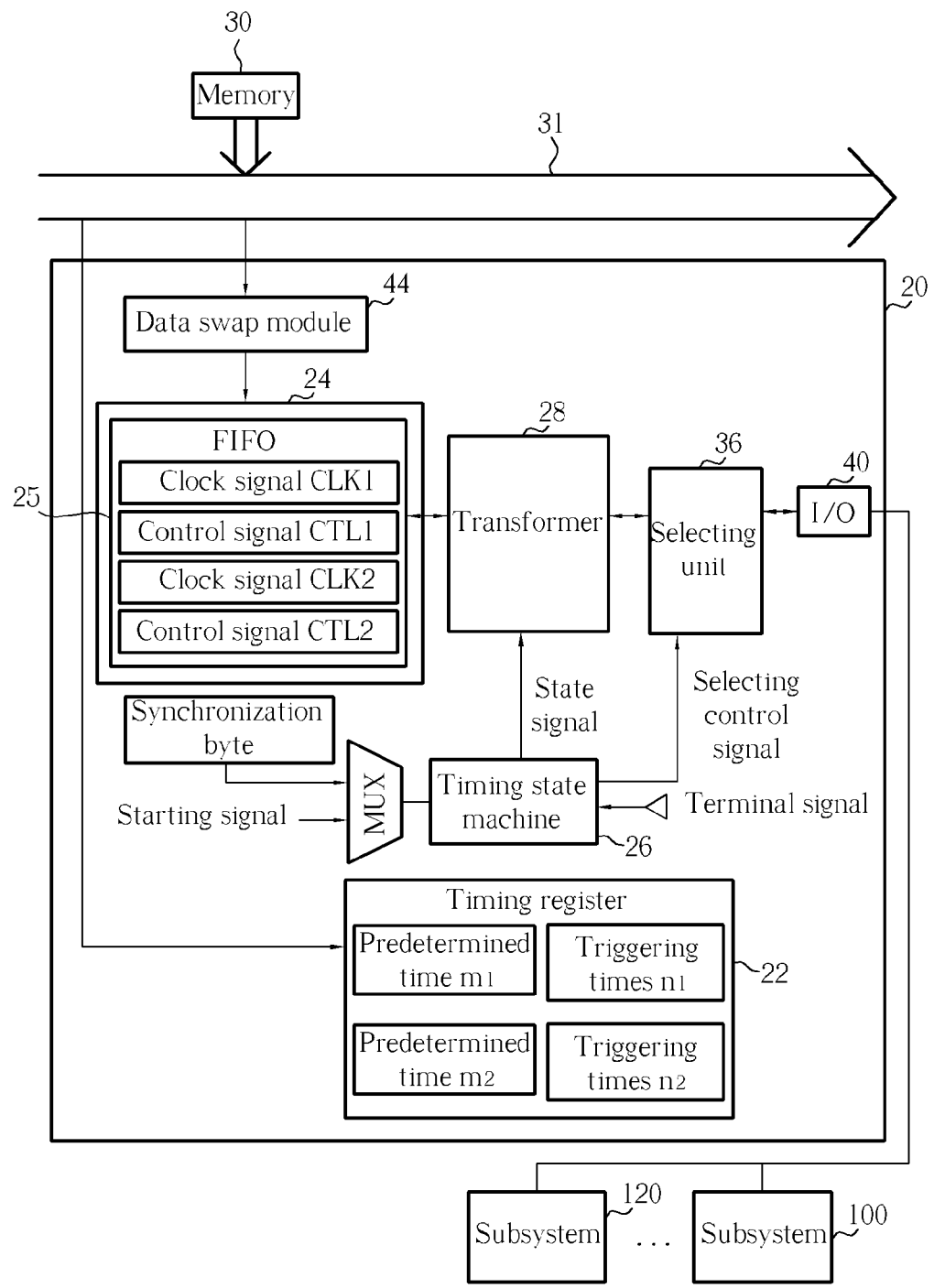
FIG. 4 is a diagram of the system working with other subsystems according to the present invention.
Figure 5:
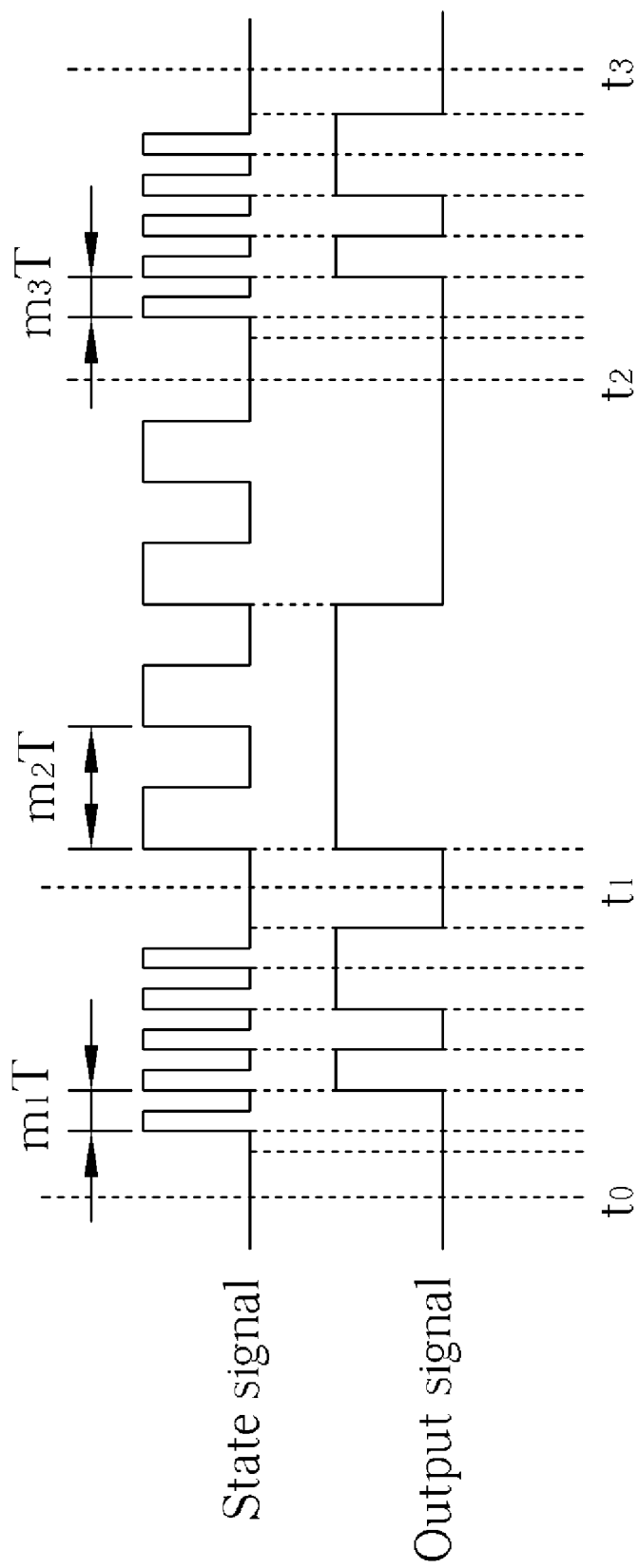
FIG. 5 is a timing diagram of the system shown in FIG. 4 outputting signals to other subsystems.

In order to meet different timing demands, the timing state machine 26 of the system 20 can adjust the speed of outputting or inputting data by adjusting the predetermined time m of the basic period width and the predetermined triggering time n stored in the timing register 22. This assumes that the system 20 is a main control IC module. If the system 20 needs to control other IC modules, which work in different timings, the system 20 needs to comprise several corresponding micro-controllers. Please refer to FIG. 4 and FIG. 5. FIG. 4 is a diagram of the system 20 working with other subsystems according to the present invention. FIG. 5 is a timing diagram of the system 20 shown in FIG. 4 outputting signals to other subsystems. The system 20 can be utilized for simultaneously coordinating a plurality of subsystems 100 and 120 (here, however, only 2 subsystems are shown.) Furthermore, the subsystems 100 and 120 work at different timings. Because the functions of the subsystems 100 and 120 are different, different control signals are needed for enabling them. In order to make the system 20 co-ordinate the two subsystems 100 and 120 (which work at different timings as previously mentioned), the data buffer 24 can simultaneously store a plurality of clock signals CLK1 and CLK2 or control signals CTL1 and CTL2, which correspond to the subsystems 100 and 120. Furthermore, the timing register 22 stores the predetermined times $m_1$ and $m_2$ of the basic period widths and the predetermined triggering times $n_1$ and $n_2$. Assuming that the subsystem 100 generates a starting request at t0, the timing state machine 26 generates the state signal per m1*T time interval according to the starting request. The register 28 outputs the clock signal CLK1 or the control signal CTL1 stored in the data buffer 24 per m1*T time interval so that the register 28 can output the clock signal or the control signal corresponding to the subsystem 100. The state signal is outputted triggering times n1 or stops being outputted when a terminal signal is received. In other words, during time t0-t1, the output port 40 of the system 20 outputs the clock signal CLK1 having m1*T period width or the control signal CTL1, or outputs the data stored in the data buffer 24 per m1*T time interval. Assuming that at time t1, the system 20 receives a starting request from the subsystem 120, the timing state machine 26 generates the state signal per m2*T according to the starting request. The register 28 then outputs the clock signal CLK2 or the control signal CTL2 per m2*T so that the register can output either of these signals while complying with the demands of the subsystem. Similarly, the state signal is outputted triggering times n2, or stops being outputted when a terminal signal is received. In other words, during time t1-t2, the output port 40 of the system 20 outputs the clock signal CLK2 or the control signal having m2*T period width, or outputs the data stored in the data buffer per m2*T. At timing t2, the system 20 receives the starting request 102 from the subsystem again. The timing state machine 26 will then output the clock signal CLK1 having m1*T period width, the control signal CTL1, or needed data through the above-mentioned mechanism.

The two subsystems 100 and 120 utilize different series transmission timings but they can still be connected to the output port 40 of the system 20. The system 20 can utilize the multiplexing characteristic to utilize the output port 40 to output clock signals having different timings, control signals, or other series transmission data. This can therefore save the pin number of the system 20 without reducing much efficiency. Moreover, if the timing of the subsystem changes, only the times m1 and m2, and n1 and n2 (predetermined times of basic period width and predetermined triggering times, respectively), or the signals stored in the data buffer 24 are adjusted so that the system 20 can coordinate with the changed subsystem. This can raise the design's flexibility.

Figure 1:
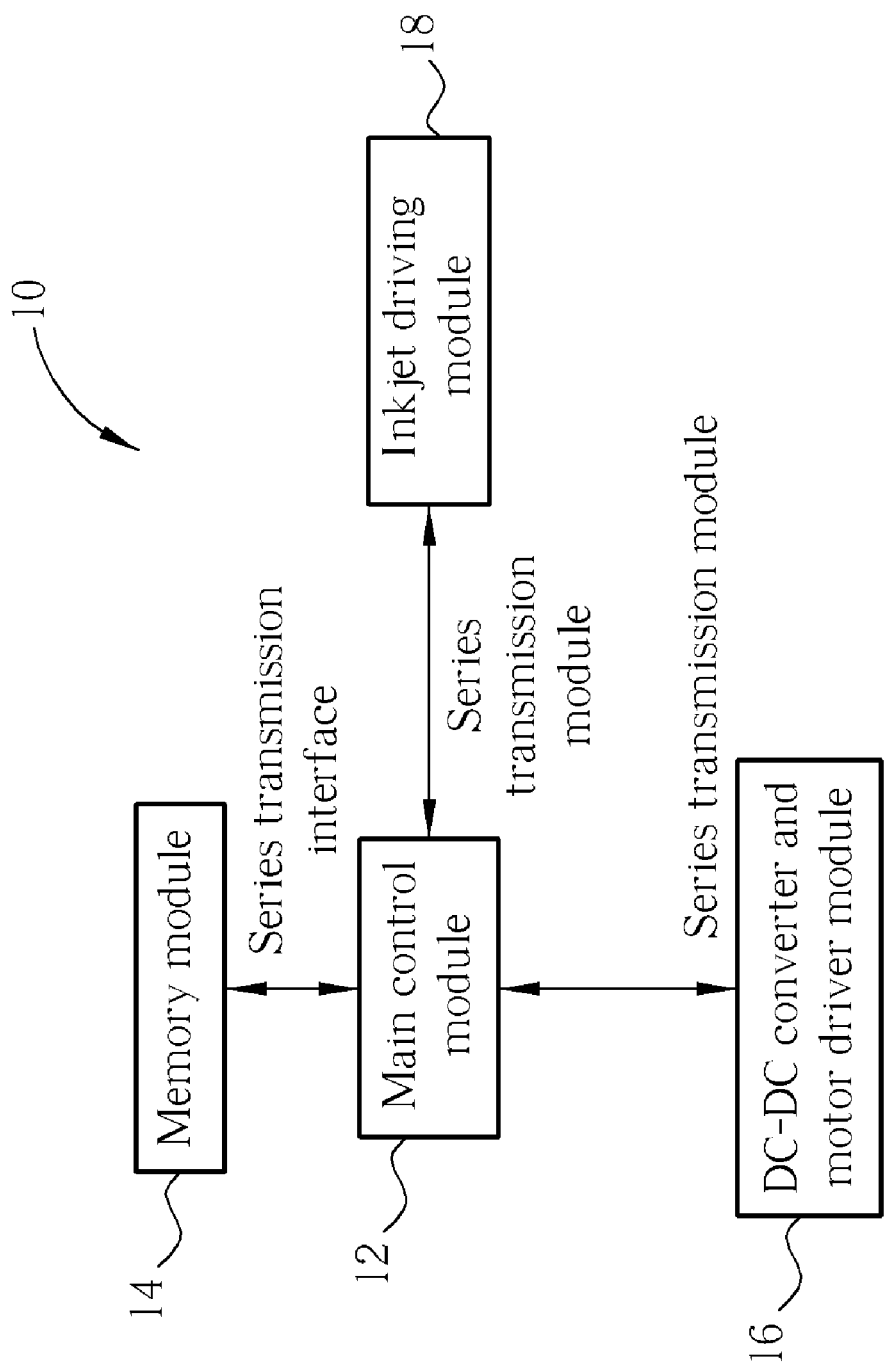
FIG. 1 is a block diagram of a printer according to the prior art.

To illustrate this advantage, the system 20 is utilized in the inkjet printer 10 shown in FIG. 1. The DC-DC converter and motor driver ASIC, or inkjet driving ASIC of the inkjet printer 10 utilize series transmission to achieve the purposes of controlling data and transferring image data. But they may utilize different timings. We only have to place the system 20 in the main control ASIC so that the DC-DC converter and motor driver ASIC and the inkjet driving ASIC can be utilized. Even if other DC-DC converter ASICs or other inkjet driving ASICs are utilized, only the times m1 and m2, and n1 and n2 (predetermined times of basic period width and predetermined triggering times, respectively), or the signals stored in the data buffer 24 need to be adjusted in order for the system 20 to coordinate with the changed ASICs.

Figure 6:
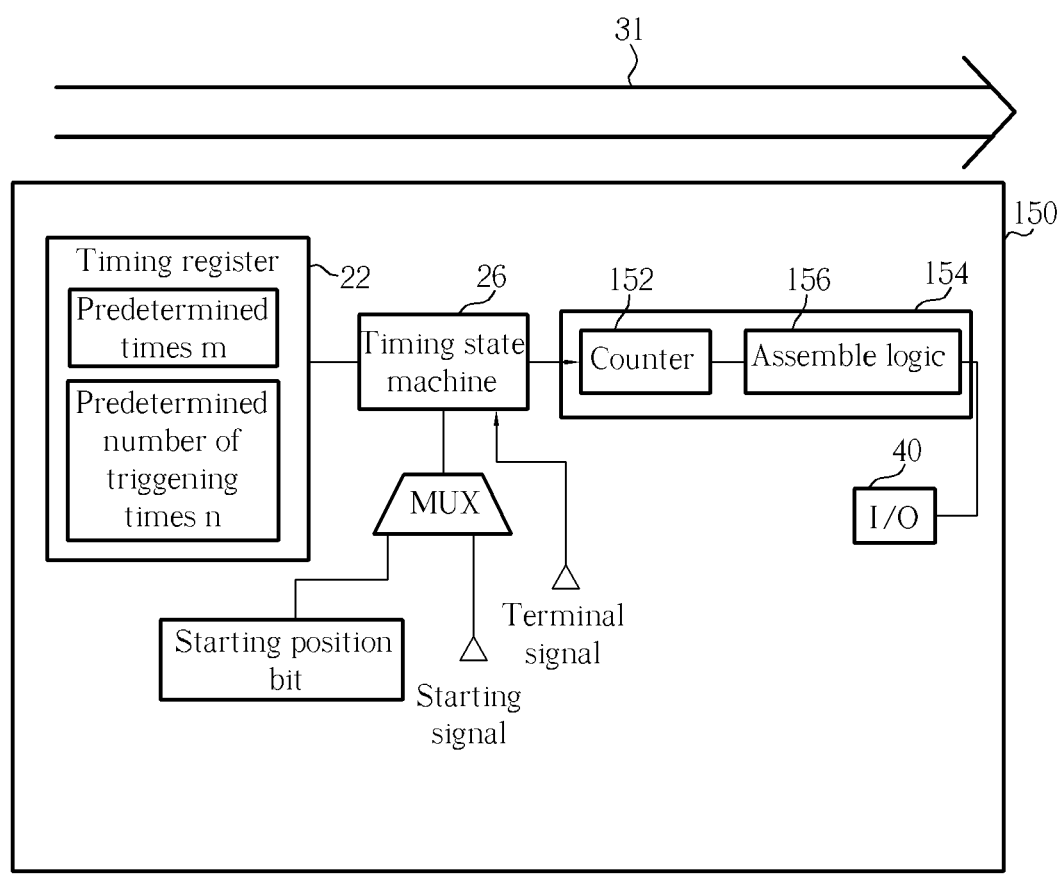
FIG. 6 is a block diagram of a system of the other embodiment according to the present invention.

Please refer to FIG. 6, which is a block diagram of a system 150 of the other embodiment according to the present invention. The system comprises a timing register 22, a timing state machine 26, and a logic circuit 154. Similar to the system 20 in FIG. 2, the timing register 22 is utilized for storing a predetermined time m of a basic period width and a predetermined triggering time n. When the timing state machine 26 receives a starting signal, the timing state machine 26 outputs a state signal having an m*T period width n times. This state signal is then transferred to the logic circuit 154. The logic circuit 154 comprises a counter 152 and an assemble logic 156. The counter 152 determines a count value according to the predetermined time n. In other words, the count value complies with the predetermined triggering time m. The assemble logic 156 determines the output signal according to the count value n and the m*T period width outputted by the timing state machine.

Figure 7:
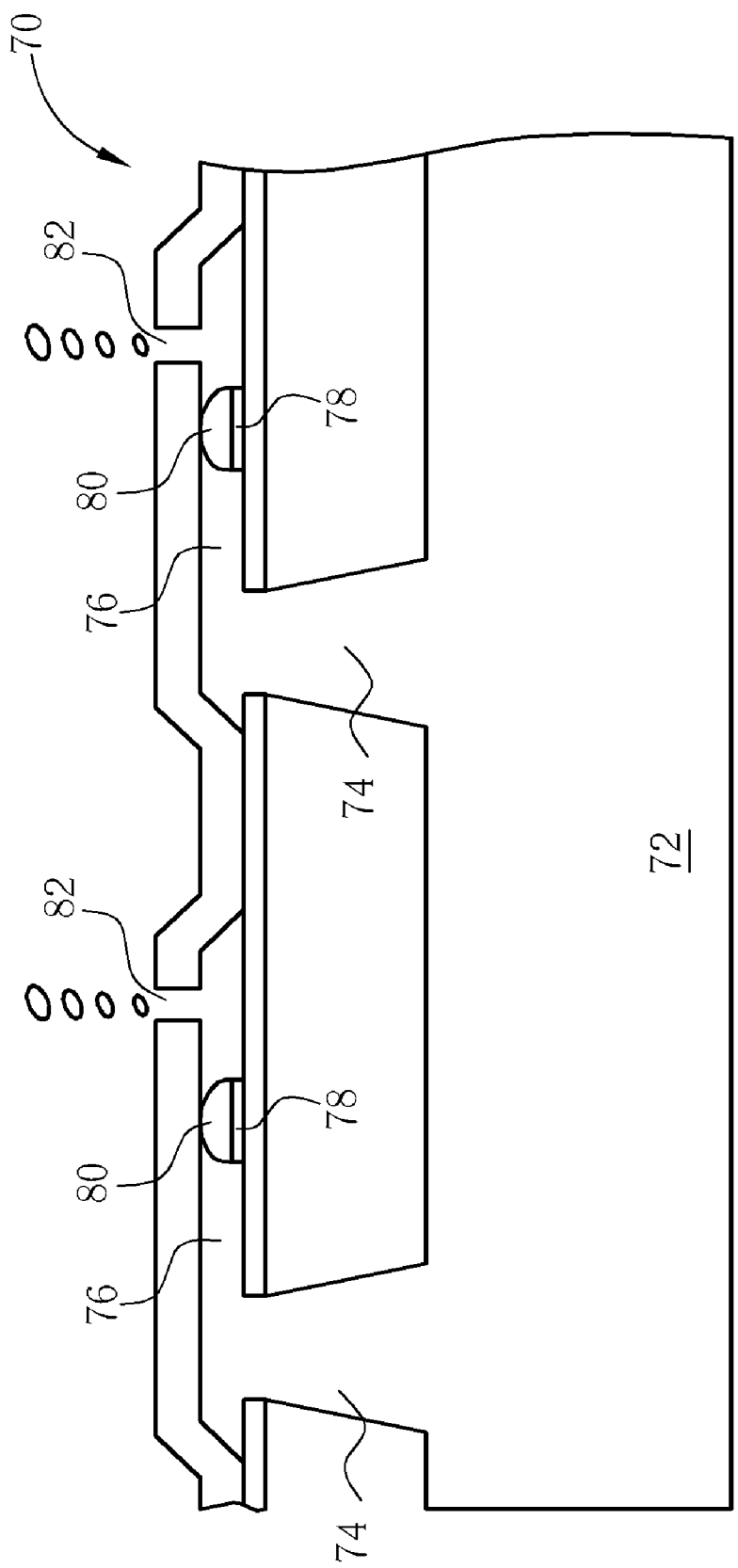
FIG. 7 is a diagram of an inkjet.
Figure 8:
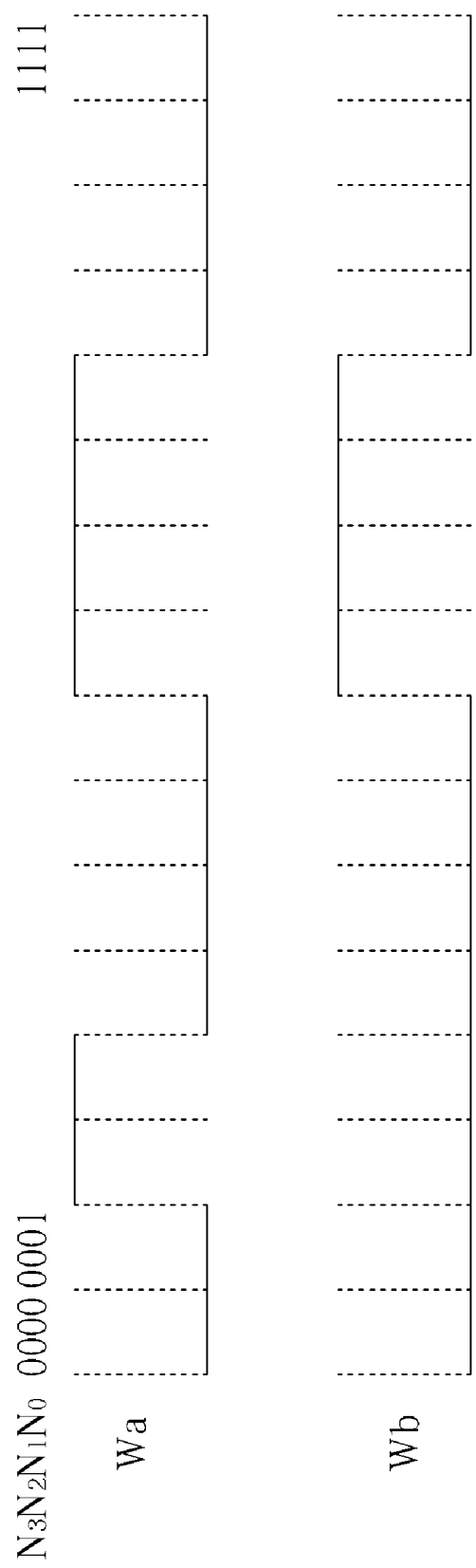
FIG. 8 is a timing diagram of a first control signal and a second control signal used for controlling the inkjet.

Please refer to FIG. 7 and FIG. 8. FIG. 7 is a diagram of an inkjet 70. FIG. 8 is a timing diagram of a first control signal and a second control signal used for controlling the inkjet 70. The inkjet 70 comprises an ink trough 72, a plurality of pipes 74, and a plurality of inkjet rooms 76. The ink trough 72 is connected to the inkjet rooms 76 through the pipes 74. As can be seen from the diagram, the ink stored in the ink trough 72 can flow to the inkjet rooms 76 through pipes 74, wherein each inkjet room 76 has a heating device 78 for heating the ink in the inkjet room 76. When the heating device 78 provides energy which is more than a predetermined energy threshold, the ink is heated to form bubbles 80 and the bubbles 80 are ejected through the nozzles 82 so that a print operation is performed. The amount of ejected ink, however, is related to the energy provided by the heating device 78. In other words, when the energy is great, the amount of ejected ink is great and the ink point is therefore bigger. From this directionally proportional relationship, it also follows that when the energy is less, the ejected ink is less and the ink point is smaller. Please note that the size of the ink point must be identical so that the printing quality can be maintained. Therefore, in addition to the energy provided by the heating device 78 of the inkjet 70 needing to be bigger than the energy threshold, the energy must also be fixed so that the size of the ink point can be maintained. When the inkjet 70 receives the first control signal Wa shown in FIG. 8, the heating device 78 of the inkjet 70 heats the ink in the ink trough 76. When the temperature of the ink in the ink trough 76 is higher than a certain threshold value, the inkjet 70 ejects the ink through the nozzles 82. In order to balance the printing quality, the inkjet 70, which does not eject the ink, receives the second control signal Wb shown in FIG. 8. (The inkjet 70 does not eject the ink because the heating device 78 heats the ink for less time.) This ensures that the temperature of the inkjet 70, which does not eject the ink, does not differ greatly from the temperature of other inkjets, which do eject the ink. Therefore, for the inkjet 70, the first control signal and the second control signal are only utilized for controlling the ink heating time of the inkjet 70.

Figure 9:
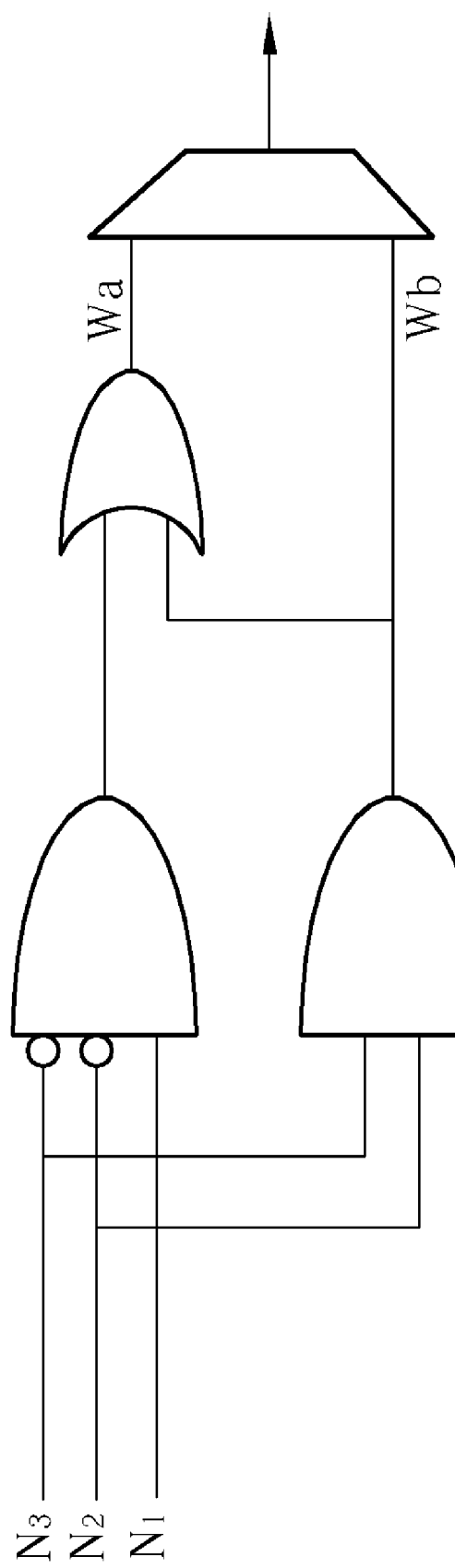
FIG. 9 is a diagram of logic gates of the assemble logic shown in FIG. 6.

Please refer to FIG. 9 and FIG. 10. FIG. 9 is a diagram of logic gates of the assemble logic 156 shown in FIG. 6. FIG. 10 is a Karnaugh map of the assemble logic 156 in FIG. 6. As mentioned above, after the timing state machine 26 outputs the state signal having m*T period width and the predetermined triggering time n to the counter 152, the counter 152 determines the count value n according to the predetermined triggering time n and counts per m*T time interval. Assuming that the count value n is 16, the counter 152 counts from a digital value "0000" to "1111" per m*T time interval. As shown in FIG. 10, the first control signal Wa= $\overline{N3N2}$N1+N3N2, and the second control signal Wb=N3N2. This means that the control signal needed by the inkjet 70 can be generated quickly. There is no need to operate in the same way as the system 20 shown in FIG. 2. The system 20 shown in FIG. 2 needs to store the first control signal and the second control signal in the data buffer 24 and therefore reduces the utilizing space of the register 24.

Please note that the printer is only regarded as an embodiment, and utilized for illustration, not a limitation. All devices which utilize the series transmission system obey the spirit of the present invention.

In contrast to the prior art, the present invention system can individually control operations of other subsystems which work at different timings. If the subsystem needs to adjust its working timing, only the predetermined times m1 and m2 of the basic period width and the predetermined triggering times n1 and n2 stored in the register, or the signals stored in the data buffer need to be adjusted in order to meet the timing demands of the subsystem so that the system can coordinate with changed subsystems. This makes the design more flexible. Furthermore, if the peripheral ICs change because of the design demands and the peripheral ICs utilize the series transmission as transmission interface, we need only re-design the PCB board and reset related control registers. It can be seen that on one hand, the main control ASIC does not need to be re-designed but on the other hand, the hardware with the present invention system has higher flexibility and does not need another micro-controller. Therefore, the present invention system has higher flexibility, can be utilized for many subsystems, and limits the need to use many micro-controllers.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A serial transmission control system capable of accessing data according to a status signal, the serial transmission control system comprising:
    a timing register for storing a predetermined time of a basic period width and a predetermined number of trigger times;
    a data buffer for storing data;
    a timing state machine for repeatedly outputting the predetermined number of triggering times of the status signals when receiving a starting signal and until receiving a terminal signal, and for stopping outputting the state signal when completely outputting the predetermined number of triggering times of the state signals; wherein the period width of the status signals complies with the predetermined time of the basic period width; and
    a transformer for accessing the data stored in the data buffer in response to the state signal generated by the timing state machine.

2. The system of claim 1, wherein the transformer comprises a PISO (parallel-in-serial-out) transformer for serially outputting the data stored in the data buffer to an outputting port in response to the state signal generated by the timing state machine.

3. The system of claim 1, wherein the transformer comprises a SIPO (serial-in-parallel-out) transformer for serially inputting data from an inputting port to the data buffer in response to the state signal generated by the timing state machine.

4. The system of claim 1, wherein the data buffer is a first-in-first-out buffer array for storing data in parallel.

5. The system of claim 1, further comprising a multiplexer for choosing to output data stored in the data buffer to the outputting port using series transmission according to a control signal outputted by the timing state machine, or to output data stored in the outputting port to the data buffer using series transmission.

6. The system of claim 1, further comprising a tri-state buffer for determining to output the data stored in the data buffer to outputting port using series transmission, or for determining to output the data stored in the outputting port to the data buffer using series transmission according to a control signal outputted by the timing state machine.

7. The system of claim 1, being utilized in a printer.

* * * * *